(12) United States Patent
Shin et al.

(10) Patent No.: US 7,933,577 B2
(45) Date of Patent: Apr. 26, 2011

(54) METHOD AND APPARATUS FOR SHARING PORTABLE TERMINAL IN CDMA SYSTEM AND MOBILE RFID SYSTEM

(75) Inventors: Chan-Soo Shin, Daejon (KR); Hae-Won Son, Daejon (KR); Won-Kyu Choi, Daejon (KR); Gil-Young Choi, Daejon (KR); Cheol-Sig Pyo, Daejon (KR); Jong-Suk Chae, Daejon (KR)

(73) Assignee: Electronics and Telecommunications Research Institute, Daejon (KR)

( * ) Notice: Subject to any disclaimer, the term of this patent is extended or adjusted under 35 U.S.C. 154(b) by 831 days.

(21) Appl. No.: 11/600,605

(22) Filed: Nov. 16, 2006

(65) Prior Publication Data
US 2007/0120679 A1    May 31, 2007

(30) Foreign Application Priority Data

Nov. 29, 2005    (KR) .................. 10-2005-0115028
Jun. 30, 2006    (KR) .................. 10-2006-0061224

(51) Int. Cl.
*H04B 1/06*    (2006.01)
*G08B 13/14*    (2006.01)
(52) U.S. Cl. ................................ 455/344; 340/572.7
(58) Field of Classification Search .............. 455/41.2, 455/78, 458, 425, 116, 127.1, 343.2, 66.1, 455/412.1, 414.1, 575.2, 207, 574, 553.1, 455/442, 435.1, 436, 343.5, 435.2, 437, 433, 455/438, 439, 440, 522, 422, 13.4; 370/342, 370/320, 331, 338, 335, 441, 311, 332, 318, 370/326, 314, 324, 323, 350; 340/572.7, 340/10.31, 10.2, 320, 3.41, 10.1, 10.3, 825.52, 7.32, 7.36, 7.38, 571
See application file for complete search history.

(56) References Cited

U.S. PATENT DOCUMENTS

| | | | | | |
|---|---|---|---|---|---|
| 5,638,399 | A | * | 6/1997 | Schuchman et al. | 370/324 |
| 5,666,355 | A | * | 9/1997 | Huah et al. | 370/311 |
| 5,668,837 | A | * | 9/1997 | Dent | 375/316 |
| 5,697,097 | A | * | 12/1997 | Reibel et al. | 340/7.35 |
| 5,706,110 | A | * | 1/1998 | Nykanen | 398/35 |
| 5,742,909 | A | * | 4/1998 | Uchida et al. | 455/517 |

(Continued)

FOREIGN PATENT DOCUMENTS
KR    1020030062524    7/2003
(Continued)

OTHER PUBLICATIONS

Notice of Preliminary Rejection from Korean Intellectual Property Office.

*Primary Examiner* — Melody Mehrpour
(74) *Attorney, Agent, or Firm* — Ladas & Parry LLP

(57) ABSTRACT

Provided are a method and apparatus for sharing a portable terminal in a Code Division Multiple Access (CDMA) and a mobile Radio Frequency Identification (RFID) system. The portable terminal includes: a CDMA mobile station system for performing CDMA communication; a mobile RFID system for performing a passive RFID reader function; a switching unit for switching an antenna to any one between the CDMA mobile station system and the mobile RFID system; and a control unit for controlling the switching unit to connect the antenna to the CDMA mobile station system when the portable terminal transmits/receives a signal to/from the base station, or connect the antenna to the mobile RFID system when the portable terminal transmits/receives a signal to/from an RFID tag.

7 Claims, 2 Drawing Sheets

U.S. PATENT DOCUMENTS

| | | | | |
|---|---|---|---|---|
| 5,745,860 A * | 4/1998 | Kallin | | 455/574 |
| 5,752,202 A * | 5/1998 | Obright | | 455/574 |
| 5,991,279 A * | 11/1999 | Haugli et al. | | 370/311 |
| 5,995,497 A * | 11/1999 | Gerakoulis | | 370/320 |
| 6,195,573 B1 * | 2/2001 | Cassidy et al. | | 455/574 |
| 6,298,114 B1 * | 10/2001 | Yoda | | 378/37 |
| 6,526,295 B1 | 2/2003 | Shull | | |
| 6,560,443 B1 * | 5/2003 | Vaisanen et al. | | 455/73 |
| 6,600,428 B1 | 7/2003 | O'Toole et al. | | |
| 6,662,021 B2 * | 12/2003 | Kang et al. | | 455/553.1 |
| 6,727,803 B2 * | 4/2004 | Hulvey | | 340/10.31 |
| 6,763,996 B2 * | 7/2004 | Rakers et al. | | 235/375 |
| 6,937,578 B1 * | 8/2005 | Hunzinger | | 370/311 |
| 7,011,309 B2 * | 3/2006 | Soltys et al. | | 273/149 R |
| 7,026,935 B2 * | 4/2006 | Diorio et al. | | 340/572.2 |
| 7,088,246 B2 * | 8/2006 | Fukuoka | | 340/572.5 |
| 7,142,521 B2 * | 11/2006 | Haugli et al. | | 370/320 |
| 7,145,437 B2 * | 12/2006 | Jalkanen et al. | | 340/10.3 |
| 7,246,746 B2 * | 7/2007 | McNamara et al. | | 235/385 |
| 7,357,299 B2 * | 4/2008 | Frerking | | 235/375 |
| 7,397,777 B1 * | 7/2008 | Sudo et al. | | 370/331 |
| 2002/0063622 A1 * | 5/2002 | Armstrong et al. | | 340/10.31 |
| 2002/0092347 A1 * | 7/2002 | Niekerk et al. | | 73/146.2 |
| 2002/0093920 A1 * | 7/2002 | Neufeld et al. | | 370/311 |
| 2002/0147042 A1 * | 10/2002 | Vuong et al. | | 463/40 |
| 2002/0159434 A1 * | 10/2002 | Gosior et al. | | 370/350 |
| 2003/0036425 A1 * | 2/2003 | Kaminkow et al. | | 463/25 |
| 2003/0064798 A1 * | 4/2003 | Grauzer et al. | | 463/29 |
| 2003/0130039 A1 * | 7/2003 | Nelson | | 463/42 |
| 2003/0148809 A1 * | 8/2003 | Nelson | | 463/29 |
| 2003/0176218 A1 * | 9/2003 | LeMay et al. | | 463/25 |
| 2004/0110472 A1 * | 6/2004 | Witkowski et al. | | 455/41.2 |
| 2004/0246100 A1 * | 12/2004 | Kranz | | 340/10.1 |
| 2005/0030377 A1 * | 2/2005 | Li | | 348/143 |
| 2005/0099269 A1 * | 5/2005 | Diorio et al. | | 340/10.51 |
| 2005/0116020 A1 * | 6/2005 | Smolucha et al. | | 235/375 |
| 2005/0198318 A1 * | 9/2005 | von Mueller et al. | | 709/228 |
| 2005/0245201 A1 * | 11/2005 | Ella et al. | | 455/78 |
| 2006/0022801 A1 * | 2/2006 | Husak et al. | | 340/10.5 |
| 2006/0076401 A1 * | 4/2006 | Frerking | | 235/380 |
| 2006/0244581 A1 * | 11/2006 | Breed et al. | | 340/447 |
| 2007/0222560 A1 * | 9/2007 | Posamentier | | 340/10.2 |
| 2009/0209283 A1 * | 8/2009 | Yang et al. | | 455/553.1 |

FOREIGN PATENT DOCUMENTS

| | | |
|---|---|---|
| KR | 1020050023822 | 3/2005 |
| KR | 1020050091483 | 9/2005 |
| KR | 10-0677481 | 2/2007 |

* cited by examiner

US 7,933,577 B2

METHOD AND APPARATUS FOR SHARING PORTABLE TERMINAL IN CDMA SYSTEM AND MOBILE RFID SYSTEM

FIELD OF THE INVENTION

The present invention relates to a method and apparatus for sharing a Code Division Multiple Access (CDMA) system and a mobile Radio Frequency Identification (RFID) system in one portable terminal; and, more particularly, to a method and apparatus for sharing a CDMA system and a mobile RFID system which can solve a power supply problem by dividing an operation time of the two systems and share one antenna in the two systems.

DESCRIPTION OF RELATED ART

A mobile Radio Frequency Identification (RFID) reader system means a system which can function as a passive RFID reader of a 900 MHz band in a portable terminal. Recently, a method for using the RFID technology in diverse fields or a method for promoting RFID services by connecting the mobile RFID reader system with a commercial mobile communication network is suggested.

However, when a Code Division Multiple Access (CDMA) mobile station system and a mobile RFID reader system are simultaneously operated, performance of a receiving part of the CDMA mobile station system is deteriorated since the transmission power of the mobile RFID reader system functions as a large interference signal to the receiving part of the CDMA mobile station system. Also, when a transmission section of the CDMA mobile station system and the operation time of the mobile RFID reader system are overlapped, a great deal of current over 1000 mA is consumed and the portable terminal requires a massive battery to acquire the current.

Therefore, an effective method for sharing a mobile communication network and a mobile RFID reader system in a portable terminal is called for.

SUMMARY OF THE INVENTION

It is, therefore, an object of the present invention to provide a method and apparatus which can effectively use a Code Division Multiple Access (CDMA) mobile station system and a mobile Radio Frequency Identification (RFID) reader system in a portable terminal.

To be specific, the object of the present invention is to provide a method and apparatus which can solve problems of interference between the two systems and power supply, and share one antenna in the two systems by separating an operation time of the CDMA mobile station system from an operation time of the mobile RFID reader system.

Other objects and advantages of the invention will be understood by the following description and become more apparent from the embodiments in accordance with the present invention, which are set forth hereinafter. It will be also apparent that objects and advantages of the invention can be embodied easily by the means defined in claims and combinations thereof.

In accordance with an aspect of the present invention, there is provided a portable terminal, including: a CDMA mobile station system for performing CDMA communication; a mobile RFID system for performing a passive RFID reader function; a switching unit for switching an antenna to any one between the CDMA mobile station system and the mobile RFID system; and a control unit for controlling the switching unit to connect the antenna to the CDMA mobile station system when the portable terminal transmits/receives a signal to/from the base station, and connect the antenna to the mobile RFID system when the portable terminal transmits/receives a signal to/from an RFID tag.

In accordance with another aspect of the present invention, there is provided a method for sharing a portable terminal in a CDMA mobile station system and a mobile RFID reader system, including the steps of: a) when an operation of the mobile RFID reader system is requested, checking whether the CDMA mobile station system is in a sleep mode; b) when the CDMA mobile station system is in the sleep mode, supplying power to the mobile RFID reader system, operating the mobile RFID reader system and receiving tag information; and c) when the tag information is received, cutting off supplying power to the mobile RFID reader system and performing related operation based on tag information.

In accordance with another aspect of the present invention, there is provided a method for sharing a portable terminal in a CDMA mobile station system and a mobile RFID reader system, including the step of: a) controlling a switching unit to connect an antenna to the mobile RFID system when the portable terminal transmits/receives signals with an RFID tag, and connect the antenna to the CDMA mobile station system in a section that the portable terminal communicates with the base station, wherein one antenna is shared according to a time-division method.

BRIEF DESCRIPTION OF THE DRAWINGS

The above and other objects and features of the present invention will become apparent from the following description of the preferred embodiments given in conjunction with the accompanying drawings, in which.

DETAILED DESCRIPTION OF THE INVENTION

Other objects and advantages of the present invention will become apparent from the following description of the embodiments with reference to the accompanying drawings. Therefore, those skilled in the art that the present invention is included can embody the technological concept and scope of the invention easily. In addition, if it is considered that detailed description on a related art may obscure the points of the present invention, the detailed description will not be provided herein. The preferred embodiments of the present invention will be described in detail hereinafter with reference to the attached drawings.

A basic principle of the present invention is to effectively use a mobile Radio Frequency Identification (RFID) reader system and a Code Division Multiple Access (CDMA) mobile station system with one antenna in a time-division method by separating the operation time of the CDMA mobile station system and the operation time of the mobile RFID reader system from each other. The interference between the two systems is reduced by operating the mobile RFID reader system in a sleep section when the CDMA mobile station system is not operated based on the slot mode characteristic of the CDMA technology.

A single pole double throw (SPDT) switch or a diplexer is required for the two systems to share one antenna. When two systems share one antenna according to the time-division method, the SPDT switch is used. When the two systems share one antenna according to a frequency-division method, the diplexer is used. A frequency band of a Korean CDMA system ranges from 824 to 893 MHz in a cellular system and from 908.5 to 914 MHz in a mobile RFID system. The frequency bands of the two systems are different from each other. However, since the two systems are very close to each other, it is difficult to divide the frequency bands of the two systems by the diplexer. As suggested in the present invention, when the two systems are operated according to the time-division method, the two systems can effectively share one antenna by using the SPDT switch. Since the KPCS band ranges from 1750 MHz to 1870 MHz which is sufficiently apart from the frequency band of the mobile RFID system, it is possible to share an antenna by using the diplexer.

Figure 1:
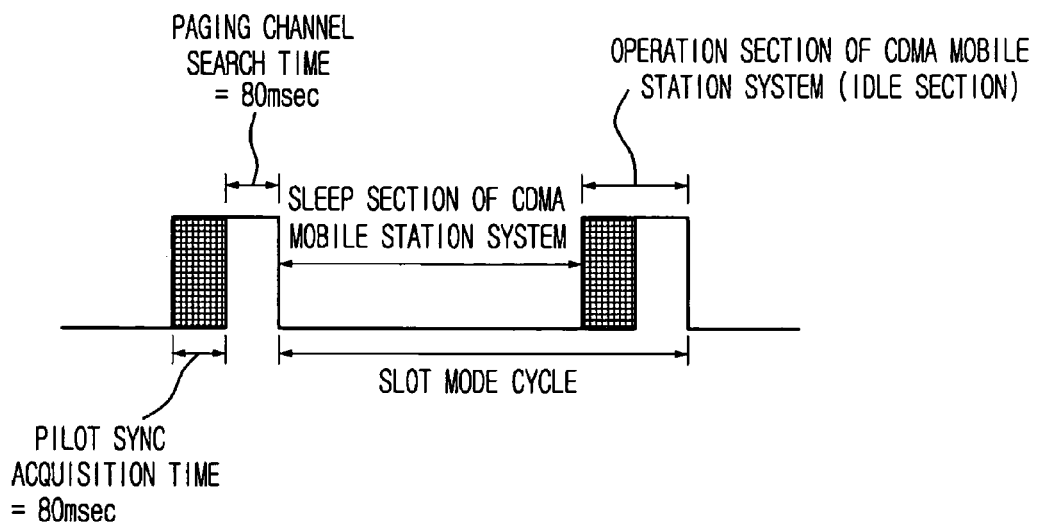
FIG. 1 shows an operation time of a Code Division Multiple Access (CDMA) mobile station system and a mobile Radio Frequency Identification (RFID) reader system in a slot mode in accordance with an embodiment of the present invention.

FIG. 1 shows an operation time of the CDMA mobile station system and the mobile RFID reader system in a slot mode in accordance with an embodiment of the present invention.

According to the CDMA method, since a base station periodically transmits time transmitted from a satellite to a mobile station, the time displayed in the mobile station is the same as the time of the base station and the satellite. Therefore, the base station is supposed to page the mobile station at a predetermined time period. Accordingly, the mobile station can reduce battery consumption by blocking hardware power of most functions except a clock function during the time other than the predetermined time. This function is called a slot mode and a time period between the base station and the mobile station is expressed as Slot_Cycle_Index. A slot mode cycle, (Slot_Cycle) that the mobile station searches for a page signal from the base station is expressed as equation 1 below.

$$\text{Slot\_Cycle} = 1.28 \times 2^{Slot\_Cycle\_Index} [\text{sec}] \quad \text{Eq. 1}$$

In FIG. 1, data of a paging channel for paging the mobile station in the base station include slots of an 80 msec unit. In case that Slot_Cycle_Index=2, the mobile station wakes up once every 5.12 sec, checks whether there is a call only for 80 msec and returns to a sleep mode. When the mobile station wakes up, catches pilot synchronization of the base station and searches for the paging channel, a time of about 80 msec is additionally required. Since the CDMA mobile station system is in the sleep mode and most hardware power is blocked except the clock function for the other time except 160 msec among 5.12 sec, the CDMA mobile station system rarely consumes power.

The present invention can reduce interference between the two systems and effectively manage power by operating the mobile RFID reader system when the CDMA mobile station system is in the sleep mode.

Figure 2:
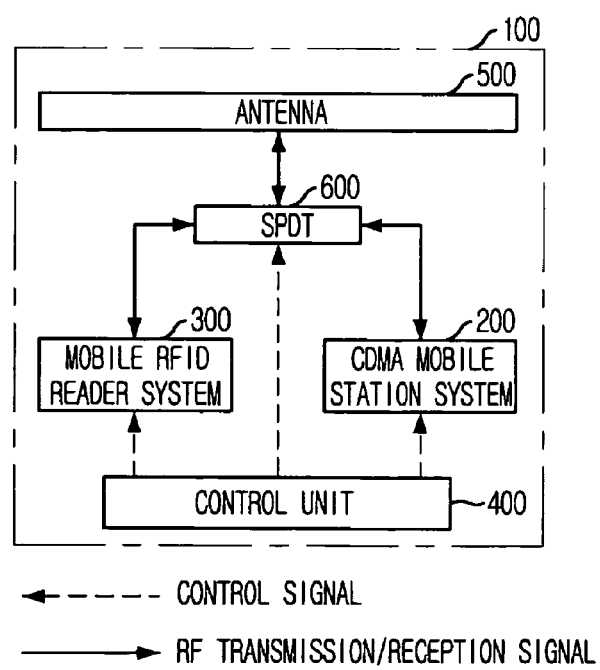
FIG. 2 is a block diagram showing a structure of a portable terminal in accordance with an embodiment of the present invention.

FIG. 2 is a block diagram showing a structure of the portable terminal in accordance with an embodiment of the present invention.

A portable terminal 100 includes a CDMA mobile station system 200, a mobile RFID reader system 300 and a control unit 400 for controlling the two systems. The portable terminal 100 further includes a SPDT switch 600 for separating an RF transmission/reception signal transmitted/received through an antenna 500 under control of the control unit 400, but the present invention is not limited to the above structure.

When the CDMA mobile station system 200 transmits/receives a signal to/from the base station, the control unit 400 sets up the SPDT switch 600 to connect the antenna 500 to the CDMA mobile station system 200. When the CDMA mobile station system 200 is in a sleep mode and the mobile RFID reader system 300 is in an operation status, the control unit 400 sets up the SPDT switch 600 to connect the antenna 500 to the mobile RFID reader system 300.

Figure 3:
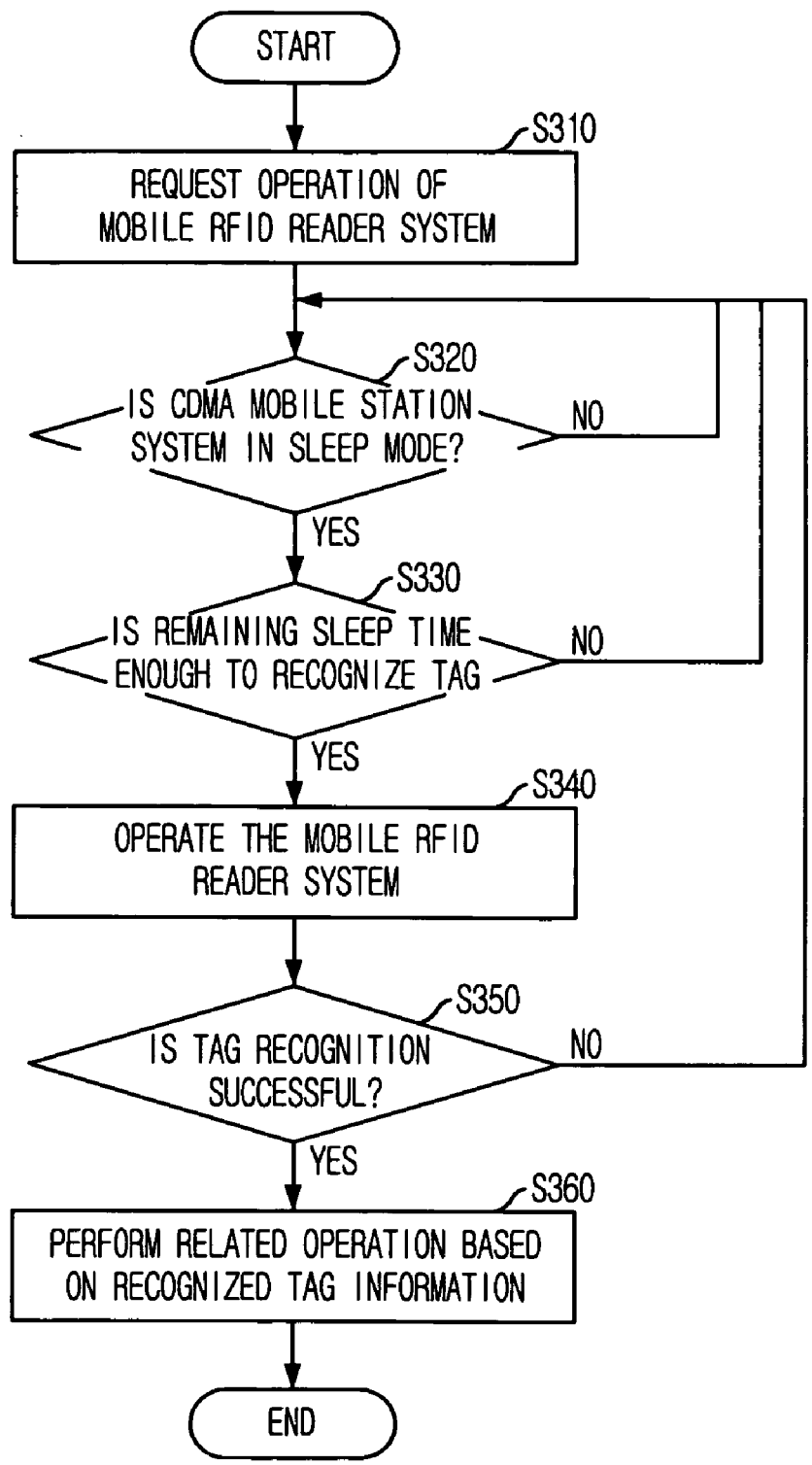
FIG. 3 is a flowchart describing a method for sharing the CDMA mobile station system and the mobile RFID reader system in the portable terminal in accordance with an embodiment of the present invention.

FIG. 3 is a flowchart describing a method for sharing the CDMA mobile station system and the mobile RFID reader system in a portable terminal in accordance with an embodiment of the present invention.

At step S310, a user clicks a specific key (not shown) of the portable terminal or selects a menu, and requests an operation of the mobile RFID reader system 300. At step S320, the control unit 400 checks whether the CDMA mobile station system 200 is in a sleep mode. When the CDMA mobile station system 200 is in the sleep mode, it is determined at step S330 whether remaining sleep time is enough to operate the mobile RFID reader system 300 and recognize a tag, i.e., shorter than or equal to 100 msec. When the remaining sleep time is enough, the control unit 400 supplies power to the mobile RFID reader system 300, operates the mobile RFID reader system 300 and tries to recognize the RFID tag at step S340.

When the mobile RFID reader system 300 successfully recognizes the tag at step S350, the control unit 300 of the terminal stops supplying power to the mobile RFID reader system 300 and performs related work based on the recognized tag information at step S360.

When the mobile RFID reader system 300 does not succeed in recognizing the tag at the step S350, the control unit 400 returns to the step S320, checks whether the CDMA mobile station system 200 is in the sleep mode and performs the logic flow again.

When the CDMA mobile station system 200 is not in the sleep mode or the remaining sleep time is not enough to operate the mobile RFID reader system 300 and recognize the tag, the control unit 400 waits until the CDMA terminal system 200 falls into the sleep mode, and operates the mobile RFID reader system 300.

The present invention relates to the method and apparatus for sharing the portable terminal of the CDMA and the RFID system on one portable terminal. To be specific, the present invention relates to the method for reducing interference between the two systems and effectively using the battery of the portable terminal by operating the mobile RFID reader system within a sleep section where the CDMA mobile station system is not operated based on the slot mode of the CDMA method.

Also, the present invention can share one antenna in the two systems according to the time-division method by using a switching circuit such as a SPDT switch by separating the operation time of the CDMA mobile station system from the operation time of the mobile RFID reader system.

While the present invention has been described with respect to certain preferred embodiments, it will be apparent to those skilled in the art that various changes and modifications may be made without departing from the scope of the invention as defined in the following claims.

For example, in the antenna division method, the two systems 200 and 300 can be realized to share one antenna 500 by using the diplexer instead of the SPDT switch 600 of FIG. 2. Herein, other operation of the control unit 400 is not required to share the antenna 500 in the two systems 200 and 300. Also, the two systems 200 and 300 do not share one antenna, but can have an individual antenna.

As described in detail, the technology of the present invention can be realized as a program and stored in a computer-readable recording medium, such as CD-ROM, RAM, ROM, a floppy disk, a hard disk and a magneto-optical disk. Since the process can be easily implemented by those skilled in the art of the present invention, further description will not be provided herein.

The present application contains subject matter related to Korean patent application Nos. 2005-0115028 and 2006-0061224, filed with the Korean Intellectual Property Office on Nov. 29, 2005, and Jun. 30, 2006, respectively, the entire contents of which are incorporated herein by reference.

What is claimed is:

1. A portable terminal, comprising:
    a Code Division Multiple Access (CDMA) mobile station system for performing CDMA communication;
    a mobile Radio Frequency Identification (RFID) system for performing a passive RFID reader function;
    a switching unit for switching an antenna to any one between the CDMA mobile station system or the mobile RFID system; and
    a control unit for controlling the switching unit to connect the antenna to the CDMA mobile station system when the portable terminal transmits/receives a signal to/from a base station, and connect the antenna to the mobile RFID system when the portable terminal transmits/receives a signal to/from an RFID tag,
    wherein one antenna is shared for operation of the mobile RFID system and the CDMA mobile station according to a time-division method in which the mobile RFID system operates during the sleep section of a slot mode cycle of the CDMA mobile station such that an operation time of the CDMA mobile station system and an operation time of the mobile RFID reader system are separated.

2. The terminal as recited in claim 1, wherein the control unit controls the switching unit to connect the antenna to the mobile RFID system only while the CDMA mobile station system is in the sleep section.

3. The terminal as recited in claim 1, wherein the switching unit is a Single Pole Double Throw (SPDT) switch.

4. A method for sharing a portable terminal in a Code Division Multiple Access (CDMA) mobile station system and a mobile Radio Frequency Identification (RFID) reader system, comprising the steps of:
    a) when an operation of the mobile RFID reader system is requested, checking whether the CDMA mobile station system is in a sleep mode;
    b) when it is determined that the CDMA mobile station system is in the sleep mode, supplying power to the mobile RFID reader system, operating the mobile RFID reader system and receiving tag information; and
    c) when the tag information is received, cutting off supplying power to the mobile RFID reader system and performing related operation based on tag information.

5. The method as recited in claim 4, wherein the tag information reception step b) includes:
    b1) when the CDMA mobile station system is in the sleep mode, determining whether remaining sleep time is enough to operate the mobile RFID reader system and recognize a tag; and
    b2) when the remaining sleep time is enough, connecting an antenna of the portable terminal to the mobile RFID reader system and trying to recognize the tag.

6. A method for sharing a portable terminal in a Code Division Multiple Access (CDMA) mobile station system and a mobile Radio Frequency Identification (RFID) reader system, comprising the step of:
    a) controlling a switching unit to connect an antenna to the mobile RFID system when the portable terminal transmits/receives signals with an RFID tag, and connect the antenna to the CDMA mobile station system in a section that the portable terminal communicates with a base station,
    wherein one antenna is shared for operation of the mobile RFID system and the CDMA mobile station according to a time-division method in which the mobile RFID system operates during the sleep section of a slot mode cycle of the CDMA mobile station such that an operation time of the CDMA mobile station system and an operation time of the mobile RFID reader system are separated.

7. The method as recited in claim 6, wherein the switching unit is a single pole double throw (SPDT) switch.

* * * * *